US007054909B1

(12) United States Patent
Ohkubo et al.

(10) Patent No.: US 7,054,909 B1
(45) **Date of Patent: *May 30, 2006**

(54) AUTOMATIC VENDING MACHINE HAVING A CONTROL SYSTEM CAPABLE OF EASILY AND RELIABLY REWRITING A CONTROL PROGRAM IN EACH TERMINAL CONTROL UNIT

(75) Inventors: Masaru Ohkubo, Isesaki (JP); Yoshiaki Inokuma, Gunma (JP); Akiyoshi Kosano, Gunma (JP); Naoto Matsumoto, Maebashi (JP); Kazuyasu Ushigome, Isesaki (JP)

(73) Assignee: Sanden Corporation, Gunma (JP)

( * ) Notice: Subject to any disclaimer, the term of this patent is extended or adjusted under 35 U.S.C. 154(b) by 665 days.

This patent is subject to a terminal disclaimer.

(21) Appl. No.: 09/695,231

(22) Filed: Oct. 25, 2000

(30) Foreign Application Priority Data

Oct. 28, 1999 (JP) .......................................... 11/306514

(51) Int. Cl.
*G06F 15/16* (2006.01)

(52) U.S. Cl. ....................... 709/208; 700/240; 700/244; 700/3; 370/398; 370/486; 717/168; 345/716; 448/170

(58) Field of Classification Search ................. 709/226, 709/208; 700/240, 244, 3; 370/398, 486; 717/168; 345/716; 448/170
See application file for complete search history.

(56) References Cited

U.S. PATENT DOCUMENTS

| | | | | | |
|---|---|---|---|---|---|
| 5,608,643 | A | * | 3/1997 | Wichter et al. | 700/244 |
| 5,610,653 | A | * | 3/1997 | Abecassis | 348/170 |
| 5,975,348 | A | * | 11/1999 | Rudewicz et al. | 221/150 R |
| 6,044,014 | A | * | 3/2000 | Komori et al. | 365/185.04 |
| 6,089,743 | A | * | 7/2000 | McQuinn | 700/240 |
| 6,233,255 | B1 | * | 5/2001 | Kato et al. | 700/486 |
| 6,339,726 | B1 | * | 1/2002 | Miyata et al. | 700/3 |
| 6,462,753 | B1 | * | 10/2002 | Koyata et al. | 345/716 |
| 6,625,158 | B1 | * | 9/2003 | Alexander et al. | 370/398 |
| 6,643,843 | B1 | * | 11/2003 | Reger | 717/168 |

* cited by examiner

*Primary Examiner*—William A. Cuchlinski, Jr.
*Assistant Examiner*—Thanh T. Nguyen
(74) *Attorney, Agent, or Firm*—Banner & Witcoff, Ltd.

(57) ABSTRACT

In a control system for an automatic vending machine with a controlled device, a terminal control unit controls the controlled device in accordance with a control program. A main control unit is connected to the terminal control unit through a transmission path and controls the terminal control unit through communication with the terminal control unit. The main control unit is provided with a transfer arrangement for transferring a new control program to the terminal control unit through the transmission path. The terminal control unit is provided with a memory and a rewriting arrangement connected to the memory. The memory is for memorizing the first-mentioned control program as a memorized control program. The rewriting arrangement is for rewriting the memorized control program into the new control program at need.

20 Claims, 5 Drawing Sheets

AUTOMATIC VENDING MACHINE HAVING A CONTROL SYSTEM CAPABLE OF EASILY AND RELIABLY REWRITING A CONTROL PROGRAM IN EACH TERMINAL CONTROL UNIT

BACKGROUND OF THE INVENTION

This invention relates to an automatic vending machine and, more particularly, to a control system used in the automatic vending machine.

Generally, an automatic vending machine includes a display device for displaying sales information such as the amount of deposited money, a commodity discharge device for controlling the discharge of commodities, and a coin validator for identifying the validity and the denomination of a deposited coin. The display device, the commodity discharge device, and the coin validator will be called herein controlled devices, respectively.

A control system of the type comprises a plurality of terminal control units coupled to the controlled devices, respectively, and a main control unit connected to each terminal control unit through a communication line known in the art. In the above-mentioned control system, the main control unit supervises and controls the terminal control units. Each of the terminal control units controls a corresponding one of the controlled devices in accordance with the content of communication with the main control unit. Each terminal control unit comprises an arithmetic unit, a memory unit, and an input/output unit for the controlled devices and the main control unit, and is operable in accordance with a control program memorized in the memory unit.

In the control system, it is assumed that modification is required in specification of each terminal control unit. In this event, the control program is changed into a new control program in response to the modification by replacing the memory unit with a new memory unit. Specifically, an ROM as the memory unit is removed and a new ROM with the new control program stored therein is mounted.

In the control system, if the control program memorized in the memory unit must be changed into a new control program in response to modification in specification of each terminal control unit, the memory unit itself is replaced by a new memory unit. Specifically, an ROM as the memory unit is removed and a new ROM with the new control program stored therein is mounted.

However, such replacement requires much time and labor and, in some cases, will cause any trouble such as bending and damaging of a pin of the ROM. In particular, each of the terminal control units is arranged adjacent to the controlled device corresponding thereto. The controlled devices are distributed at various positions in the automatic vending machine in dependence upon their functions. Therefore, if the terminal control unit is arranged at a difficult position uneasy to reach, the replacement of the memory unit often requires very much time and labor. In case where the memory units are replaced collectively for a plurality of terminal control units, the exchange operation must be carried out one by one and one after another. This requires extraordinarily much time and labor. In addition, there is a risk of incorrect replacement of the memory units.

Taking the above into consideration, proposal is made of a control system using an EEPROM (Electrically Erasable Programmable Read-Only Memory), which is electrically rewritable, as the memory unit of the terminal control unit.

In the proposed control system, each terminal control unit comprises a connection unit capable of removably connecting a memory card. In addition, each terminal control unit has a rewriting program. The memory card with a new control program preliminarily stored therein is loaded in the connection unit. Then, the above-mentioned rewriting program is executed to renew the control program memorized in the memory unit into the new program stored in the memory card. In the above-mentioned method, it is possible to relatively easily update the control program without the complicated operation such as the replacement of the ROM. However, the latter problem described above can not be solved yet.

SUMMARY OF THE INVENTION

It is therefore an object of this invention to provide a control system for an automatic vending machine, which is capable of easily and reliably rewriting a control program in each terminal control unit.

Other objects of the present invention will become clear as the description proceeds.

A control system to which the present invention is applicable is for an automatic vending machine including a controlled device. The control system comprises a terminal control unit connected to the controlled device for controlling the controlled device in accordance with a control program and a main control unit connected to the terminal control unit through a transmission path for controlling the terminal control unit through communication with the terminal control unit, the main control unit including transfer means for transferring a signal with a new control program to the terminal control unit through the transmission path. The terminal control unit comprises memorizing means for memorizing the first-mentioned control program as a memorized control program and rewriting means connected to the memorizing means and the transfer means for rewriting the memorized control program into the new control program.

DESCRIPTION OF THE PREFERRED EMBODIMENT

Figure 1:
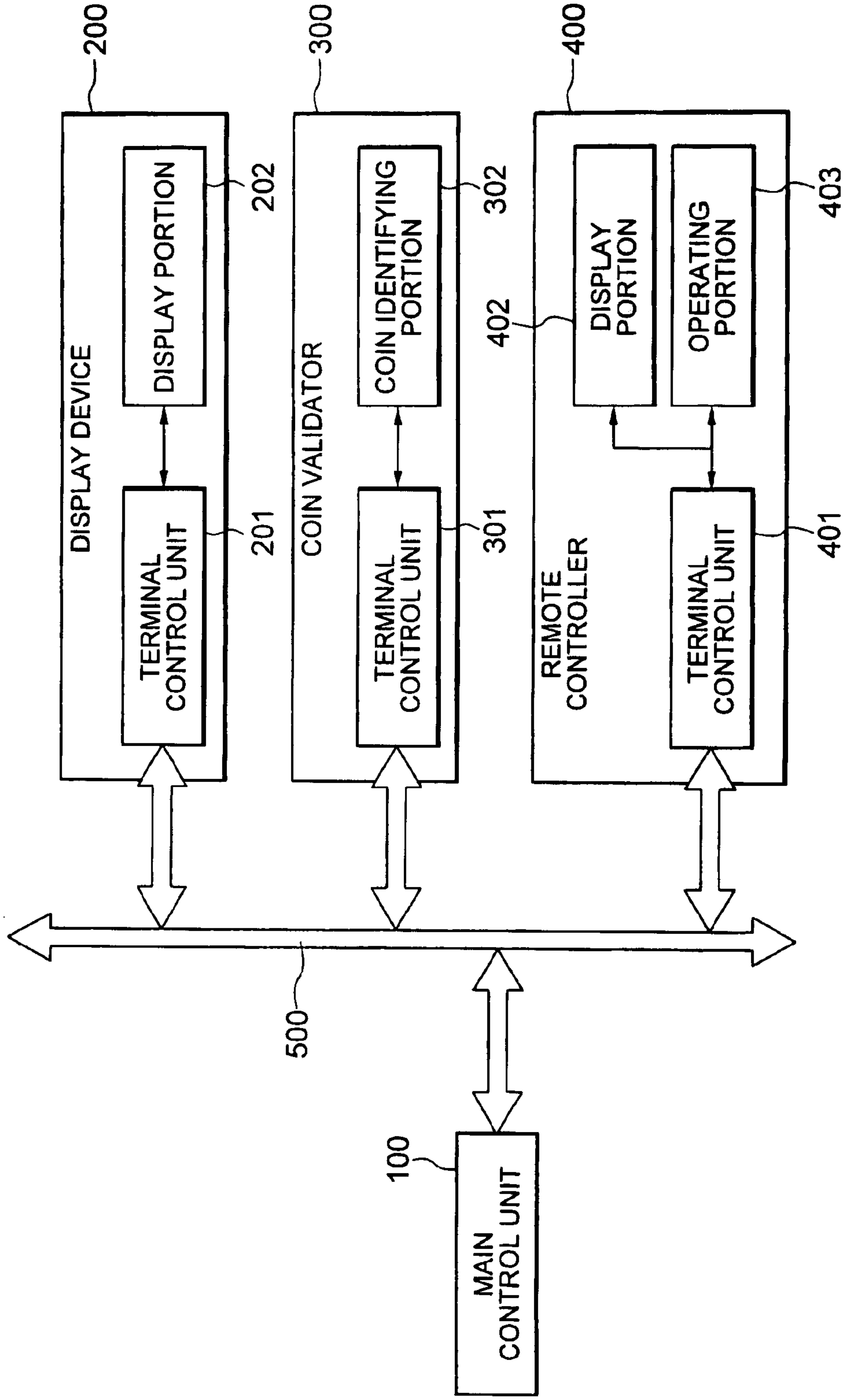
FIG. 1 is a block diagram of a control system for an automatic vending machine according to an embodiment of the present invention.

Now, description will be made of a control system for an automatic vending machine according to an embodiment of this invention with reference to the drawing.

Referring to FIG. 1, the control system for an automatic vending machine comprises a main control unit 100, various controlled devices including a display device 200, a coin validator 300, a remote controller 400, a commodity discharge device (not shown), and a bill validator (not shown), and a transmission path 500 connecting the main control unit 100 and each of the controlled devices. The display device 200 comprises a display portion 202 such as a 7-segment LED and a terminal control unit 201 connected to the display portion 202 for controlling the display portion 202. Similarly, the coin validator 300 comprises a coin identifying portion 302 for identifying the validity and the denomination of a deposited coin and a terminal control unit 301 for controlling the coin identifying portion 302. The remote controller 400 comprises a display portion 402, an operating portion 403, and a terminal control unit 401 connected to the display portion 402 and the operating portion 403. In the above-mentioned control system, each controlled device is controlled via mutual or bidirectional communication between the main control unit 100 and each of the terminal control units 201, 301, and 401 of the controlled devices through the transmission path 500. In the following, description will be directed only to the display device 200 as one of the controlled devices.

Figure 2:
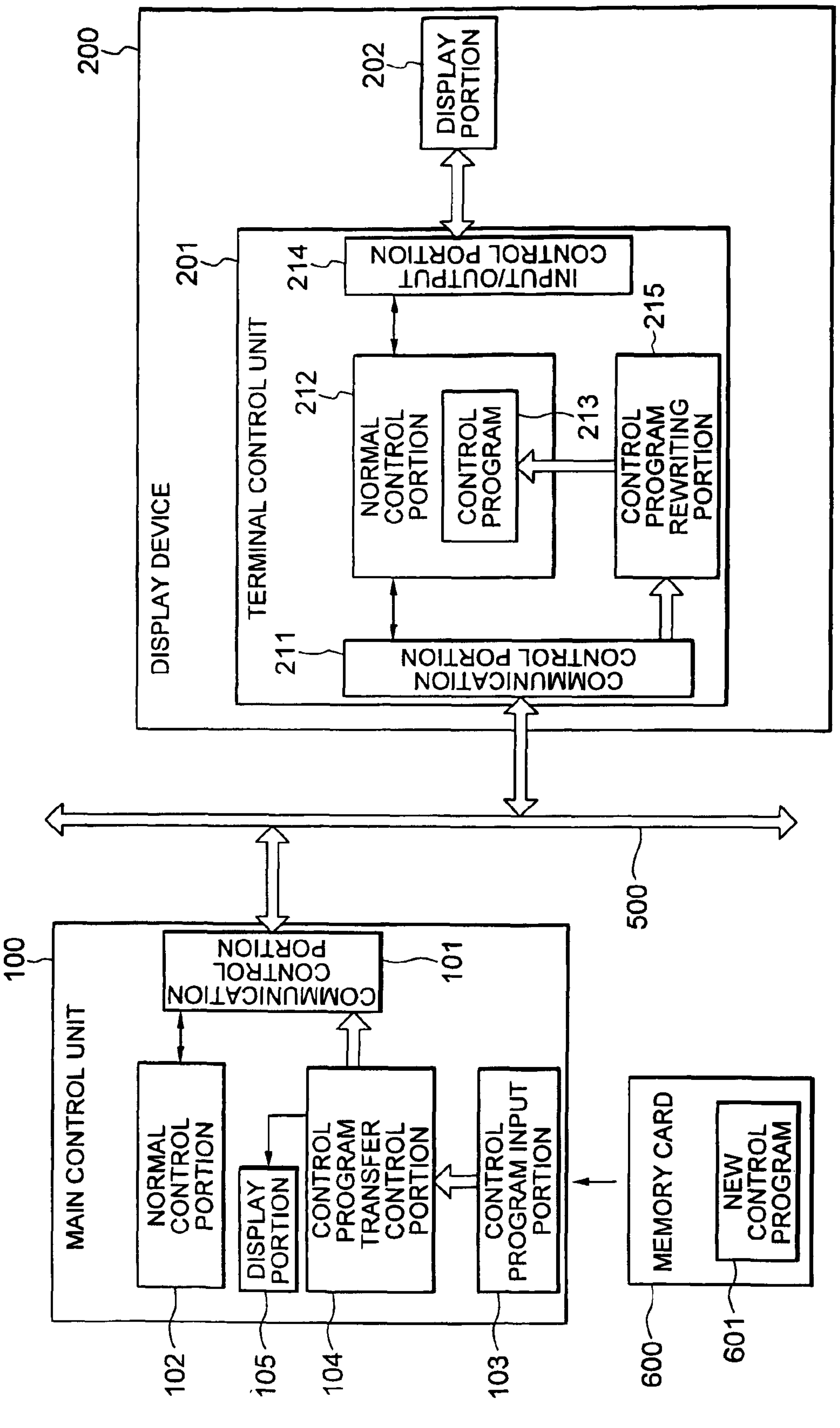
FIG. 2 is a functional block diagram of a part of the control system of FIG. 1.

As shown in FIG. 2, the main control unit 100 comprises a communication control portion 101 for controlling the communication with the terminal control unit 201 through the transmission path 500 and a normal control portion 102 for controlling each controlled device so that each controlled device carries out a predetermined operation in a normal mode, for example, during a commodity selling operation or upon sales management. The main control unit 100 further comprises a control program input portion 103 for inputting a new control program 601 from a flash memory card 600 as one of removable storage media and a control program transfer control portion 104 as a transfer arrangement for transferring the new control program 601 supplied from the control program input portion 103 to the terminal control unit 201. The main control unit 100 further comprises a display portion 105 for notifying execution of a rewriting operation of rewriting the control program to a manager or an operator of the automatic vending machine.

The communication control portion 101 mainly comprises a communication equipment corresponding to the transmission path 500. Specifically, the communication control portion 101 controls packet communication between the main control unit 100 and the terminal control unit 201 through the transmission path 500. The packet communication is carried out by the use of a normal communication protocol in the manner known in the art.

For communication involving the control program transfer control portion 104, the communication control portion 101 carries out a control operation in a different control mode different from a normal control mode upon normal communication involving the normal control portion 102. Specifically, in the communication involving the control program transfer control portion 104, the communication control portion 101 carries out the control operation such that a data transfer rate is increased as compared with the normal communication. Such control operation is carried out in cooperation with a communication control portion 211 of the terminal control unit 201 which will be described later. The data transfer rate is increased, for example, by increasing the communication speed of the transmission path 500, suppressing communication between any other terminal control unit and the main control unit, or switching an ordinary communication protocol into a special communication protocol capable of carrying out high-speed transfer. In this event, a combination of the communication control portions 101 and 211 will be referred to as a transfer rate control arrangement.

The normal control portion 102 serves to control each controlled device so that each controlled device carry out the predetermined operation in the normal mode, for example, during a commodity selling operation or upon sales management by the manager. For example, the normal control portion 102 requests the display device 200 to start a display operation. The details of the control operation for each controlled device is similar to that known in the art and will not be described herein.

The control program input portion 103 serves to input the new control program 601 to the control program transfer control portion 104. Therefore, the structure of the control program input portion 103 is determined in dependence upon a medium used upon inputting the new control program 601. For example, in case where a memory card 600 is used as the medium as illustrated in FIG. 2, the control program input portion 103 mainly comprises a memory card reader. In case where a CD-ROM or a floppy disk is used as the medium, the control program input portion 103 mainly comprises an appropriate reader corresponding thereto. In case where a communication line is used as the medium, the control program input portion 103 mainly comprises a communication equipment adapted to the communication line. For example, use may be made of a modem, a TA, or a router. The communication line used as medium may be either a wired communication line or a wireless communication line.

The control program transfer control portion 104 serves to transfer the new control program 601 supplied from the control program input portion 103 to the terminal control unit 201. Specifically, the control program transfer control portion 104 judges the necessity of the transfer operation or the rewriting operation of the new control program 601 and, if necessary, transfers the new control program 601 to the terminal control unit 201 of a particular controlled device as an object of operation of the new control program 601 through the transmission path 500. In this event, the control program transfer control portion 104 serves as a judging arragenment. The details of the judgment will be described later.

The terminal control unit 201 comprises the above-mentioned communication control portion 211 for controlling the communication with the main control unit 100 through the transmission path 500, a normal control portion 212 for controlling the display portion 202 so that the display portion 202 carries out the predetermined operation in the normal mode, for example, during the commodity selling operation or upon the sales management, and an input/output control portion 214 connected to the display portion 202. The terminal control unit 201 comprises a control program rewriting portion 215 for rewriting a control program 213 in the normal control portion 212 in accordance with the new control program 601 transferred from the main control unit 100.

Like the communication control portion 101 of the main control unit 100, the communication control portion 211 mainly comprises a communication equipment corresponding to the transmission path 500. Specifically, the communication control portion 211 controls packet communication with the communication control portion 101 of the main control unit 100 through the transmission path 500. When the new control program 601 is transferred, the communication control portion 211 cooperates with the communication portion 101 of the main control unit 100 and carries out a control operation in a different control mode different from a normal control mode upon the normal communication. Specifically, when the new control program 601 is transferred, the communication control portion 211 carries out the control operation such that the data transfer rate is increased as compared with the normal communication. The data transfer rate is increased, for example, by increasing the communication speed of the transmission path 500, suppressing the communication between any other terminal control unit and the main control unit, or switching the ordinary communication protocol into the special communication protocol capable of carrying out the high-speed transfer.

Carrying out mutual communication with the main control unit 100, the normal control portion 212 controls the display portion 202 connected through the input/output control portion 214. The details of the control operation by the normal control portion 212 is similar to that known in the art and will not be described herein. The normal control portion 212 is operable in accordance with the control program 213. The control program 213 is memorized in the memory unit which is electrically rewritable.

The control program rewriting portion 215 serves to rewrite the control program 213 in the normal control portion 212 into the new control program 601 transferred from the main control unit 100 through the transmission path 500. Specifically, the control program rewriting portion 215 judges whether or not the new control program 601 meets predetermined rewrite requirements and, only when the new control program 601 meets the rewrite requirements, i.e., only when the rewriting operation is possible, rewrites the control program 213 into the new control program 601. The details of this judgment will be described later.

The transmission path 500 is a communication medium for carrying out mutual communication between the communication control portion 101 of the main control unit 100 and the communication control portion 211 of the terminal control unit 201. As the transmission path 500, use may be made of not only a wire medium such as a metallic cable and an optical fiber but also a wireless medium. In this embodiment, the metallic cable is used.

Figure 3:
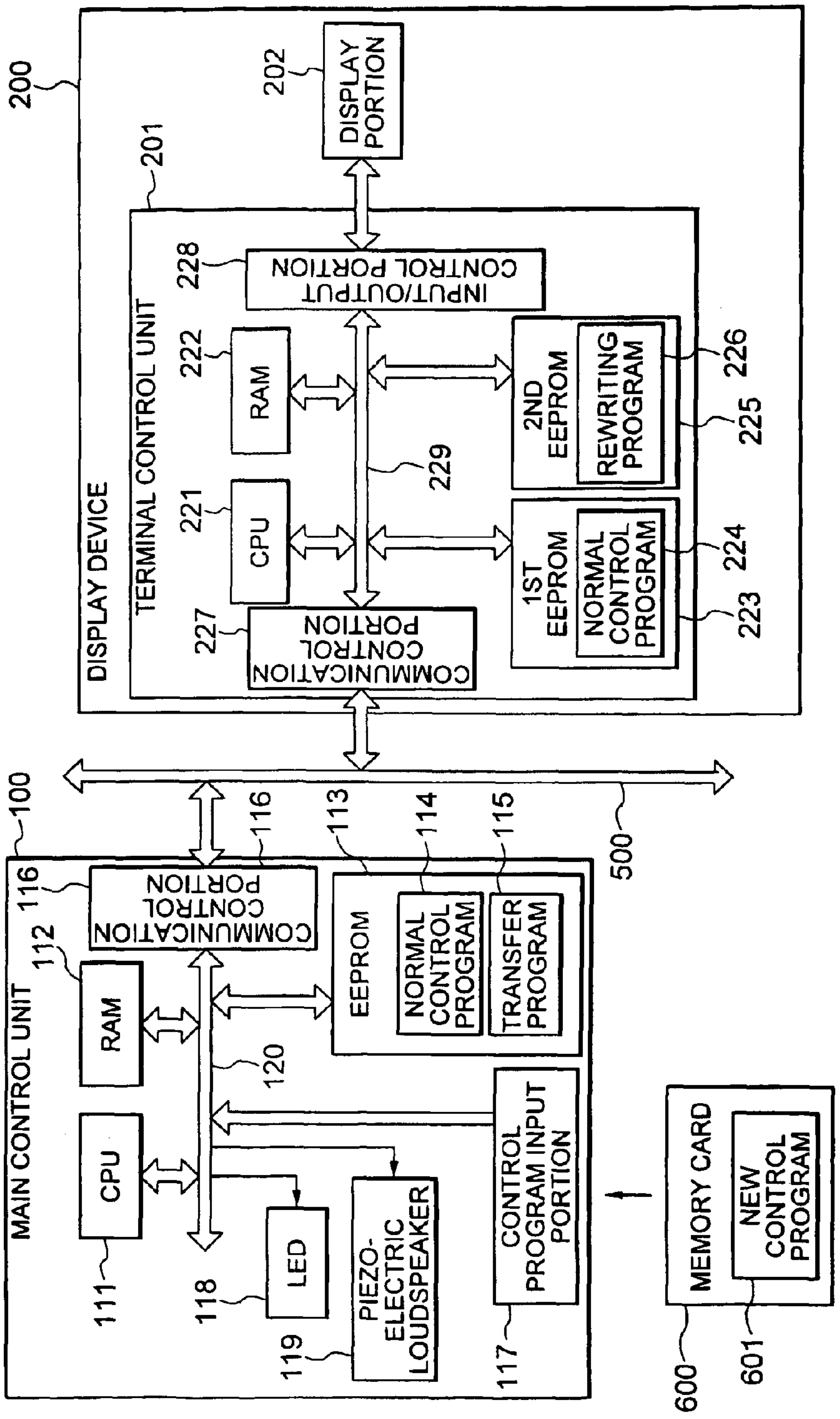
FIG. 3 is a circuit diagram of the part illustrated in FIG. 2.

Referring to FIG. 3, description will be made of a specific example of a circuit structure of the above-mentioned control system for an automatic vending machine.

As shown in FIG. 3, the main control unit 100 comprises a CPU 111, a RAM 112, an EEPROM 113, a communication control portion 116, a control program input portion or arrangement 117, a LED 118, a piezoelectric loudspeaker 119, and a bus 120 connecting the above-metioned components. The RAM 112 is a volatile memory such as a SRAM and a DRAM and serves as a memory unit for various kinds of operations. The EEPROM 113 is a nonvolatile memory which is electrically rewritable and stores a normal control program 114 and a transfer program 115. The normal control portion 116 serves as an interface with the transmission path 500. The control program input portion 117 serves an interface with the memory card 600 which is a storage medium memorizing the new control program 601. The LED 118 and the piezoelectric loudspeaker 119 serve to announce or display various kinds of information to the outside by means of light or sound.

The terminal control unit 201 comprises a CPU 221, a RAM 222, a first EEPROM 223, a second EEPROM 225, a communication control portion 227, and an input/output control portion 228. The RAM 222 is a volatile memory such as a SRAM and a DRAM and mainly serves as a memory unit for various kinds of operations. Each of the first EEPROM 223 and the second EEPROM 225 is a nonvolatile memory which is electrically rewritable. The first EEPROM 223 memorizes a normal control program 224 as a memorized control program. The first EEPROM 223 is referred to as a memorizing arrangement.

The second EEPROM 225 memorizes a rewriting program 226. The communication control portion 227 serves as an interface with the transmission path 500. The input/output control portion 228 serves an interface with the display portion 202.

Figure 4:
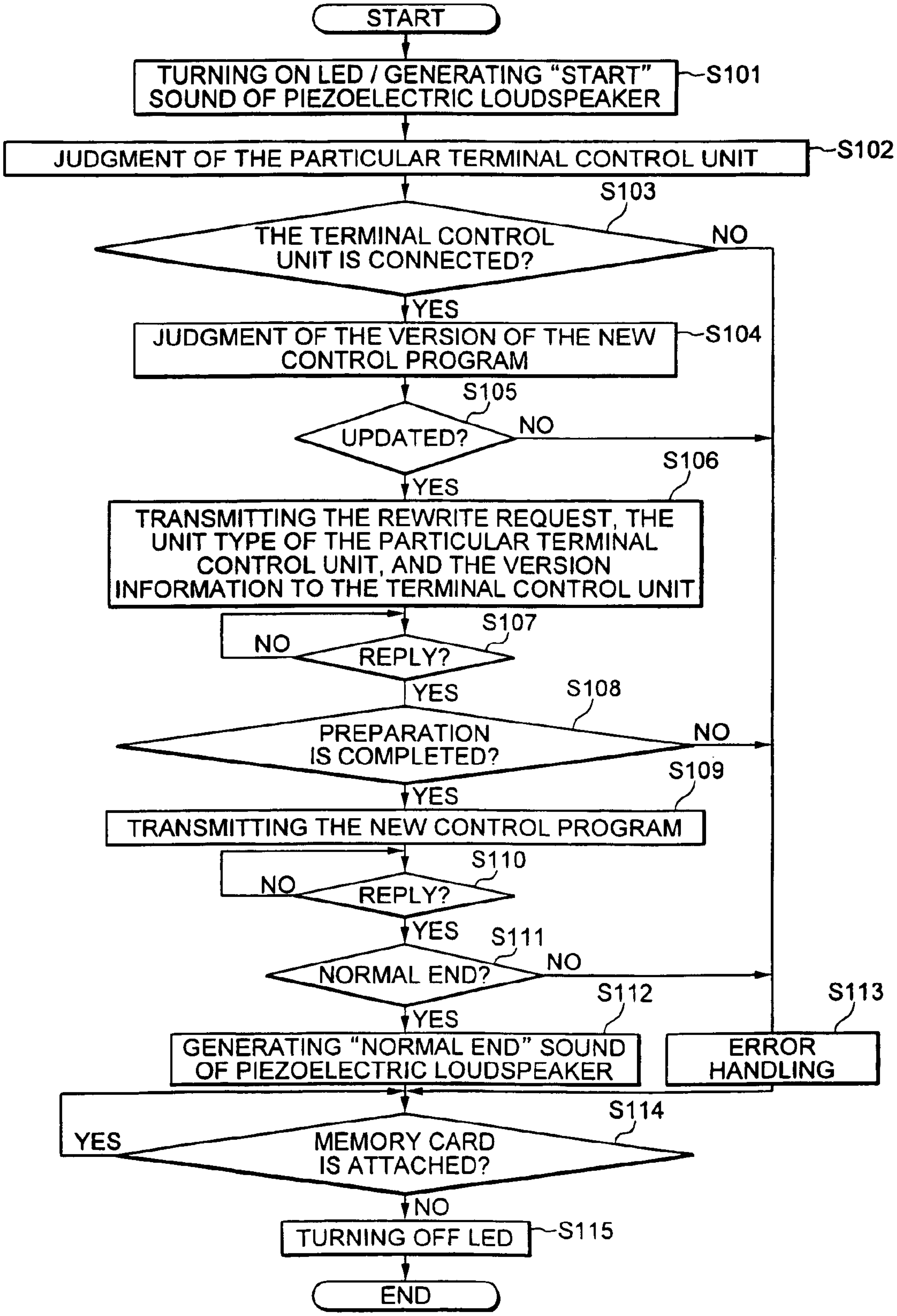
FIG. 4 is a flow chart for describing transfer operation of the control system of FIGS. 1 through 3.

Next, description will be made of an operation of the main control unit 100. The main control unit 100 is operable in accordance with the normal control program 114 and the transfer program 115 memorized in the EEPROM 113. The control operation according to the normal control program 114 is similar to that known in the art and will not be described herein. Hereinafter, the operation according to the transfer program 115 will be described with reference to FIG. 4.

In the transfer program 115, the operation is started when the memory card 600 is loaded in the control program input portion 117 during the normal operation according to the normal control program 114.

First, in order to display and announce the start of the transfer operation, the LED 118 is turned on and the piezoelectric loudspeaker 119 is made to generate a sound (step S101). Herein, the piezoelectric speaker 119 produces a single alarm sound "pip" of a short duration.

Next, unit type data identifying the type of a particular terminal control unit as an object of the operation is read from the new control program 601 memorized in the memory card 600. With reference to the unit type data thus read, judgment is made about whether or not the particular terminal control unit is connected to the main control unit 100 through the transmission path 500 (step S102). If the terminal control unit is not connected to the main control unit 100, the operation proceeds to a step S113 to perform error handling (step S103).

Next, the version information included in the new control program 601 is read and judgment is made about whether or not the new control program 601 is an update program (step S104). If the new control program 601 is not an update version, the operation proceeds to the step S113 to perform the error handling (step S105).

Then, a rewrite request, the unit type data of the particular terminal control unit, and the version information of the new control program 601 are transmitted through the transmission path 500 to the terminal control unit 201 as the object of the rewriting operation (step S106). Thereafter, a reply from the terminal control unit 201 is waited (step S107). If the reply from the terminal control unit 201 indicates an "abnormal end", the operation proceeds to the step S113 to carry out the error handling (step S108).

If the reply from the terminal control unit 201 indicates "preparation completed", the new control program 601 is transmitted to the terminal control unit 201 (step S109). Then, another reply from the terminal control unit 201 is waited (step S10). If the reply indicates "abnormal end", the operation proceeds to the step S113 to perform the error handling (step S111).

If the reply from the terminal control unit 201 incates "normal end", the piezoelectric loudspeaker 119 is made to generate a sound to announce that the rewriting opertion has not normally been ended (step S112). Herein, the piezoelectric loudspeaker 119 produces a single alarm sound "peep" of a long duration.

In the step S113 to which the operation proceeds from each of the steps S103, S105, S108, and S111, the piezoelectric loudspeaker 119 is made to generate a sound to announce that the rewriting operation is not normally ended (step S113). Herein, the piezoelectric loudspeaker 119 generates several alarm sounds "peep, peep, peep" of a long duration.

Finally, it is confirmed that the memory card 600 is removed (step S114) and the LED 118 is turned off and the operation is ended (step S115). After the completion of the operation according to the transfer program 115, the operation according to the normal control program 114 is restarted.

Figure 5:
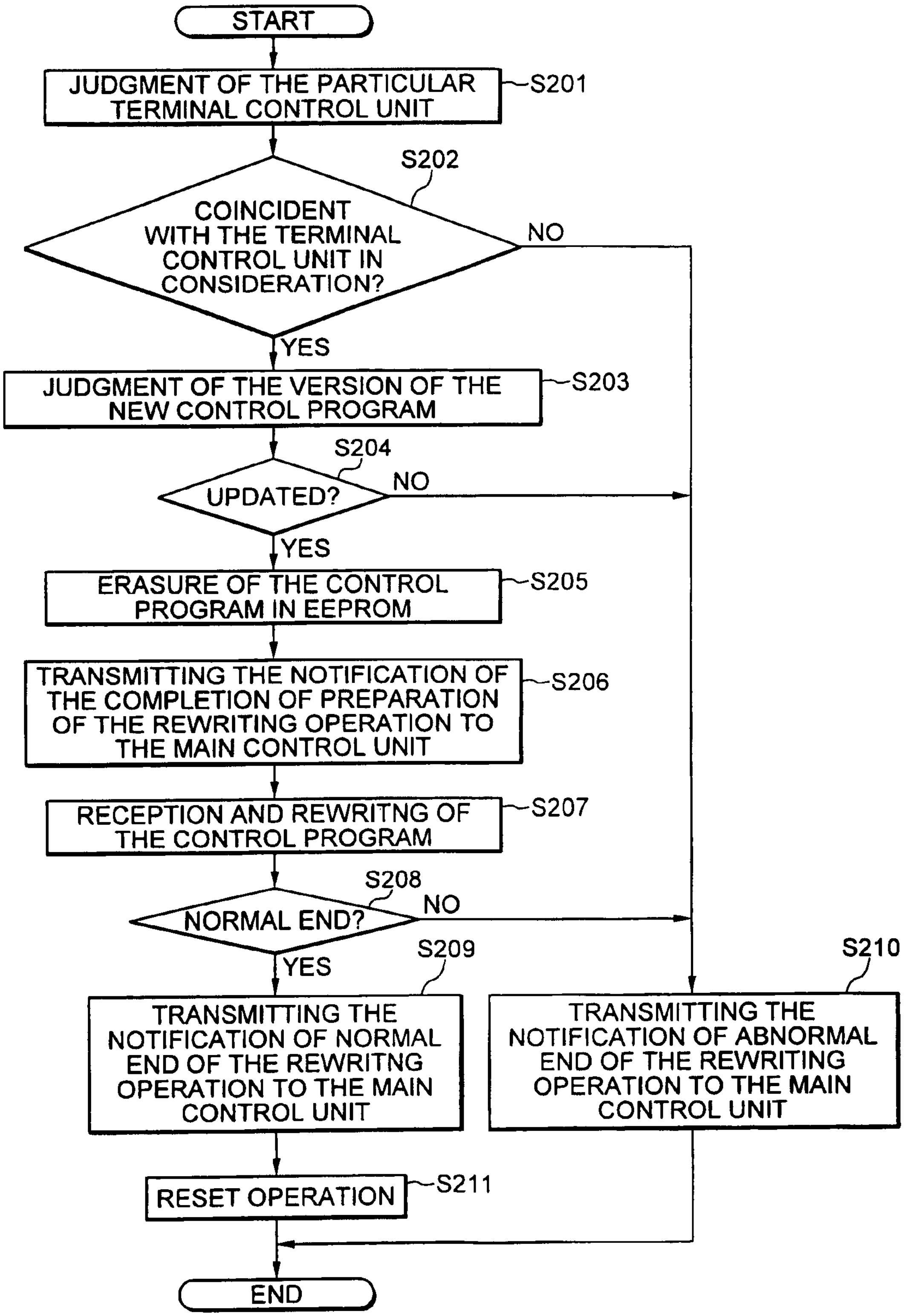
FIG. 5 is a flow chart for describing rewriting operation of the control system of FIGS. 1 through 3.

Next, description will be made of the operation of the terminal control unit 201. The terminal control unit 201 is operable in accordance with the normal control program 224 memorized in the first EEPROM 223 and the rewrite program 226 memorized in the second EEPROM 225. The operation according to the normal control program 224 is similar to that in the prior art and will not be described herein. Hereinafter, the operation according to the rewriting program 226 will be described with reference to FIG. 5.

In the rewriting program 226, the operation is started when the rewrite request is received from the main control unit 100 (see the step S106 in FIG. 4) during the normal operation according to the normal control program 224.

At first, judgment is made about whether or not the unit type data supplied from the main control unit 100 together with the rewrite request is coincident with the type of the terminal control unit in consideration, i.e., the terminal control unit supplied with the rewrite request (step S201). If the type data supplied is not coincident with the type of the terminal control unit in consideration, the operation proceeds to the step S210 to perform the error handling (step S202).

Next, transmitted version information supplied from the main control unit 100 together with the rewrite request is read and judgment is made about whether or not the program is an update program (step S203). Specifically, comparison is made between the transmitted version information and the version information of the normal control program 224 memorized in the first EEPROM 223 to judge whether or not the transmitted version information is newer. If the transmitted version information is older, the operation proceeds to the step S210 to perform the error handling (step S204).

On carrying out the steps 202–205, the CPU 221 is referred to as another judging arrangement which permits the rewriting arrangement or the CPU 221 to access the first EEPROM 223 when the memorized control program should be rewritten.

Next, the CPU 221 erases the content of the normal program 224 from the first EEPROM 223 (step S205). The main control unit 100 is notified through the transmission path 500 that preparation for the rewriting operation is completed (step S206). In response to the notification, the main control unit 100 transmits the new control program 601 through the transmission path 500 to the terminal control unit 201 (see the step S109 in FIG. 4). The terminal control unit 201 receives the new control program 601 to make the CPU 221 write the new control program 601 in the first EEPROM 223 (step S207). Therefore, the memorized control program is rewritten into the new control program 601. In this event, the CPU 221 is referred to as a rewriting arrangement.

Next, judgment is made about whether or not the writing operation of the new control program 601 into the first EEPROM 223 is normally ended. If the writing operation is not normally ended, the operation proceeds to the step S210 to perform the error handling (step S208). If the writing operation is normally ended, the main control unit 100 is notified through the transmission path 500 that the writing operation is normally ended (step S209).

In the step S210 to which the operation proceeds from each of the steps S202, S204, and S207, the main control unit 100 is notified through the transmission path 500 that the process is abnormally ended (step S210).

Finally, the terminal control unit 201 is reset and the rewriting operation according to the rewriting program 226 comes to an end. Then, the normal operation according to the new normal control program 224 written in the first EEPROM 223 is started (step S211).

As described above, the new control program 601 is transferred from the memory card 600 to the terminal control unit 201 through the transmission path 500 with the memory card 600 being loaded in the main control unit 100. The control program 224 in the terminal control unit 201 is rewritten by the new control program 601 thus transferred. Thus, the control program can easily and reliably be updated irrespective of the location of the terminal control unit 201.

When the new control program 601 is transferred, the communication control portions 101 and 116 of the main control unit 100 in cooperation with the communication control portions 211 and 227 of the terminal control unit 201 carry out the control operation such that the transfer rate is increased. It is therefore possible to update the control program in a short time.

In addition, both of the main control unit 100 and the terminal control unit 201 judge whether or not the rewriting operation by the new control program 601 is to be carried out it is therefore possible to prevent the occurrence of any errorneous rewriting operation. In particular, the judgment is carried out before the new control program 601 is transferred. Therefore, in case where the rewriting operation is not to be carried out, an unnecessary transfer operation is avoided. It is also possible to prevent the increase of traffic in the transmission path 500.

While the present invention has thus far been described in connection with a few embodiments thereof, it will readily be possible for those skilled in the art to put this invention into practice in various other manners. For example, a floppy disk or a CD-ROM may be used as the medium for inputting the new control program 601 to the main control unit 100. The new control program 601 may be supplied through a communication line such as a telephone line network and a packet line network. As the communication line, use may be made of either a wired communication line such as a metallic cable and an optical cable or a wireless communication line, for example, using a mobile telephone and a PHS. The normal control program 224 and the rewriting program 226 may be memorized in the same EEPROM.

What is claimed is:

1. A control system for an automatic vending machine including a controlled device, said control system comprising:

a terminal control unit connected to said controlled device for controlling said controlled device in accordance with a control program; and a main control unit connected to said terminal control unit through a transmission path for controlling said terminal control unit through communication with said terminal control unit, said main control unit including transfer means for transferring a signal with a new control program to said terminal control unit through said transmission path;

said terminal control unit comprising:

memorizing means for memorizing the first-mentioned control program as a memorized control program; and rewriting means connected to said memorizing means and said transfer means for rewriting said memorized control program into said new control program.

2. The control system according to claim 1, further comprising transfer rate control means for increasing a data transfer rate of said control program when said control program is transferred from said main control unit to said terminal control unit.

3. The control system according to claim 2, wherein said transfer rate control means is connected to said transmission path and controls said transmission path to have a communication speed increased.

4. The control system according to claim 2, wherein said automatic vending machine further includes another controlled device, said control system further comprising another terminal control unit connected to said other controlled device, said main control unit being connected to said other terminal control unit, said transfer rate control means being connected to said main control unit and controlling said main control unit to suppress the communication between said other control unit and said main control unit when said control program is transferred from said main control unit to the first-mentioned terminal control unit.

5. The control system according to claim 2, wherein said communication is carried out by the use of a normal communication protocol, said transfer rate control means switching said normal communication protocol into a special communication protocol by which said transfer means transfers said new control program to said terminal control unit through said transmission path.

6. The control system according to claim 1, wherein said main control unit comprises input means connected to said transfer means for supplying said new control program to said transfer means.

7. The control system according to claim 6, wherein said input means is adapted to use of a removable storage medium memorizing said new control program, said input means reading said new control program from said removable storage medium to supply said new control program to said transfer means.

8. The control system according to claim 6, wherein said input means is connected to a communication line for transmitting said new control program, said input means receiving said new control program through said communication line to supply said new control program to said transfer means.

9. The control system according to claim 1, wherein said main control unit comprises judging means connected to said transfer means for judging in response to said new control program whether or not a rewrite of said memorized control program is to be executed, said judging means permitting said transfer means to transmit said new control program towards said terminal control unit when said rewrite is to be executed.

10. The control system according to claim 1, further comprising judging means connected to said transfer means for judging with reference to said signal whether or not said memorized control program should be rewritten, said judging means permitting said rewriting means to access said memorizing means when said memorized control program should be rewritten.

11. The control system according to claim 10, wherein said judging means judges whether or not said signal includes said new control program directed to said terminal control unit, said judging means permitting said rewriting means to access said memorizing means only when said signal includes said new control program directed to terminal control unit.

12. The control system according to claim 10, wherein said judging means compares version information of said new control program with version information of said memorized control program to permit said rewriting means to access said memorizing means only when the version information of said new control program is updated.

13. The control system according to claim 10, wherein said judging means is included in said main control unit.

14. The control system according to claim 10, wherein said judging means is included in said terminal control unit.

15. The control system according to claim 1, wherein further comprising indicating means connected to said rewriting means for indicating execution of rewriting said memorized control program operation.

16. A control system for an automatic vending machine including a controlled device, said control system comprising:

a terminal control unit connected to said controlled device for controlling said controlled device in accordance with a control program; and a main control unit connected to said terminal control unit through a transmission path for controlling said terminal control unit through communication with said terminal control unit, said main control unit including a transfer device for transferring a signal with a new control program to said terminal control unit through said transmission path;

said terminal control unit comprising:

a memorizing device for memorizing the first-mentioned control program as a memorized control program; and a rewriting device connected to said memorizing device and said transfer device for rewriting said memorized control program into said new control program.

17. The control system according to claim 16, further comprising transfer rate control device for increasing a data transfer rate of said control program when said control program is transferred from said main control unit to said terminal control unit.

18. The control system according to claim 16, wherein said main control unit comprises an input device connected to said transfer device for supplying said new control program to said transfer device.

19. The control system according to claim 16, wherein said main control unit comprises a judging device connected to said transfer device for judging in response to said new control program whether or not a rewrite of said memorized control program is to be executed, said judging device permitting said transfer device to transmit said new control program towards said terminal control unit when said rewrite is to be executed.

20. The control system according to claim 16, further comprising a judging device connected to said transfer device for judging with reference to said signal whether or cot said memorized control program should be rewritten, said judging device permitting said rewriting device to access said memorizing device when said memorized control program should be rewritten.

* * * * *

UNITED STATES PATENT AND TRADEMARK OFFICE

CERTIFICATE OF CORRECTION

PATENT NO. : 7,054,909 B1 
APPLICATION NO. : 09/695231
DATED : May 30, 2006
INVENTOR(S) : Masaru Ohkubo et al.

It is certified that error appears in the above-identified patent and that said Letters Patent is hereby corrected as shown below:

Column 10, line 58, change “cot” to --not--.

Signed and Sealed this

Twenty-ninth Day of August, 2006

JON W. DUDAS
*Director of the United States Patent and Trademark Office*